(12) United States Patent
Reshadi et al.

(10) Patent No.: US 11,080,065 B1
(45) Date of Patent: *Aug. 3, 2021

(54) CONFIGURATION TRANSFORMATION AND DELIVERY

(71) Applicant: Akamai Technologies, Inc., Cambridge, MA (US)

(72) Inventors: Mehrdad Reshadi, Sunnyvale, CA (US); Madhukar Nagaraja Kedlaya, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/374,581

(22) Filed: Apr. 3, 2019

Related U.S. Application Data

(60) Provisional application No. 62/651,935, filed on Apr. 3, 2018.

(51) Int. Cl.
| | | |
|---|---|---|
| *G06F 9/44* | (2018.01) | |
| *G06F 9/445* | (2018.01) | |
| *H04L 29/08* | (2006.01) | |

(52) U.S. Cl.
CPC .......... *G06F 9/44505* (2013.01); *H04L 67/02* (2013.01)

(58) Field of Classification Search
CPC ............................ G06F 9/44505; H04L 67/02
See application file for complete search history.

(56) References Cited

U.S. PATENT DOCUMENTS

| | | | |
|---|---|---|---|
| 7,836,458 B1* | 11/2010 | Gwozdz | .................. H04L 67/10 719/320 |
| 2003/0084030 A1* | 5/2003 | Day | .................... G06F 16/2453 |
| 2016/0063384 A1* | 3/2016 | Green | ...................... G06N 5/04 706/12 |

* cited by examiner

*Primary Examiner* — Stefan Stoynov

(57) ABSTRACT

A method of generating an optimized executable configuration query engine is disclosed. A set of one or more immutable configuration parameters associated with a configurable service or a configurable application is received. At least a portion of a set of configuration data in a configuration database and at least a portion of the set of one or more immutable configuration parameters are transformed into a set of data and code in a compiler-readable format. An optimized subset of the set of configuration data in the configuration database is selected based at least in part on the set of one or more immutable configuration parameters. An optimized executable configuration query engine is generated based at least in part on the set of one or more immutable configuration parameters, wherein the optimized executable configuration query engine serves configuration data from the selected optimized subset of the set of configuration data.

31 Claims, 10 Drawing Sheets

US 11,080,065 B1

CONFIGURATION TRANSFORMATION AND DELIVERY

CROSS REFERENCE TO OTHER APPLICATIONS

This application claims priority to U.S. Provisional Patent Application No. 62/651,935 entitled CONFIGURATION TRANSFORMATION MICROSERVICE and filed on Apr. 3, 2018, which is incorporated herein by reference for all purposes.

BACKGROUND OF THE INVENTION

Typically, web content is delivered to the end-user device via a proxy delivery network, such as a content delivery network (CDN). Delivering web content from a content provider via a proxy delivery network has many advantages: a proxy delivery network can distribute the load, save bandwidth, boost performance, and reduce cost; in addition, a proxy delivery network may be a proxy acceleration network that can provide additional enhancing services, such as HTML streaming, caching, and content integrity protection.

Configuring a proxy acceleration network is highly complex and involves a large amount of configuration data. A proxy acceleration system includes different components, such as proxy servers and client-side virtualization agents (also referred to as Nanovisors) running on the client devices. Each of the components may be configured differently from the others. In addition, the proxy acceleration system supports many different services (e.g., the HTML streaming service), and the modules (e.g., HTML streaming module) corresponding to the supported services may have many different configurable options.

Similarly, configuring a distributed cloud system is highly complex and involves a large amount of configuration data. This is because a distributed cloud system has many different components and services spread out in the network.

The entire configuration for the proxy acceleration network or a distributed cloud system is too large and too sensitive to be sent to the individual components/services; rather, each component/service in the proxy acceleration network has its own view of the entire configuration. In particular, each component/service uses only a portion of the entire configuration, and each component/service only depends on a portion of the entire configuration. Therefore, only the relevant part of the configuration data may be sent to the component/service. Furthermore, only changes to specific portions of the configuration data that are relevant to a specific component/service may be sent to the component/service. Services are also allowed to put their own views on top of the received configuration data, thereby enabling the services to use only the portions of the configuration data that they need.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
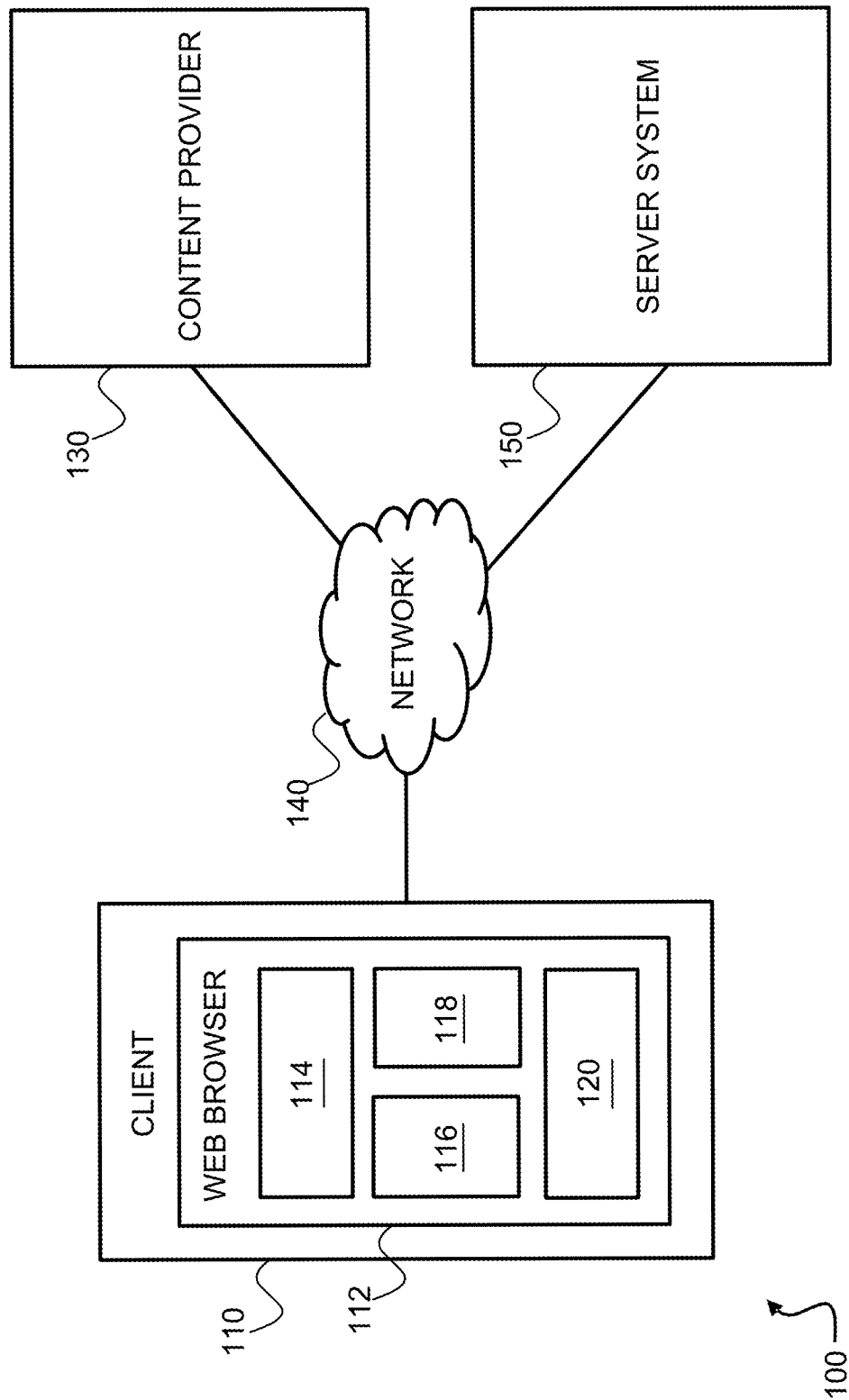
FIG. 1 is a schematic diagram showing an example of a proxy acceleration system 100 that may be configured using the techniques disclosed in the present application.

FIG. 1 is a schematic diagram showing an example of a proxy acceleration system 100 that may be configured using the techniques disclosed in the present application. The system 100 comprises a client device 110 and a content provider system 130, which are communicatively coupled through a network 140. The client device 110 is configured with a web browser 112 for retrieval and rendering of webpages from the content provider system 130. The client device 110 may comprise a laptop computer, a desktop computer, a tablet computer, a smartphone, or any other device capable of installing and running the web browser 112. The content provider system 130 may comprise a web server, such as an origin server or any other apparatus capable of serving webpages to the client device 110. The network 140 may comprise any combination of public or private networks, including intranets, local area networks (LANs), wide area networks (WANs), radio access networks (RANs), Wi-Fi networks and/or the Internet.

The web browser 112 is configured to receive a webpage definition 116 (e.g., web content) from the content provider system 130 for rendering and presentation of a corresponding webpage to a user of the client device 110. For example, the web browser 112 may retrieve the webpage definition 116 from the content provider system 130 by issuing one or more network requests according to the Hypertext Transfer Protocol (HTTP) (e.g., one or more GET requests) or any other suitable networking or Internet protocol. The webpage definition 116 may comprise a file formatted according to one or more mark-up languages, such as Hypertext Mark-up Language (HTML) and/or Extensible Mark-up Language (XML), etc. The webpage definition 116 may also comprise content in the form of dynamically executable code, defined in terms of one or more programming languages (e.g., JavaScript, JavaScript Object Notation (JSON), etc.), such as interpreted programming languages, scripting languages, managed programming languages, web programming languages, etc. The webpage definition 116 may also comprise content in the form of one or more display attributes, defined in a style sheet language such as the Cascading Style Sheets (CSS) language.

The webpage definition 116 may refer to one or more dependent resources to be obtained and/or rendered by the web browser 112. Examples of such resources include image files, script files, video files, audio files, Adobe Flash content, HTML5 content, other webpage files, and the like. Typically, the resources are stored in one or more repositories that are located remote from the client device 110 and are retrieved by the web browser 112 prior to rendering of the associated webpage, or portion thereof. The web browser 112 may locate and retrieve the one or more resources based on one or more respective resource identifiers associated with the webpage definition 116. Examples of a resource identifier include a Uniform Resource Identifier (URI), a Uniform Resource Locator (URL), a network path, a location address, a storage location and any other content identifier. The one or more resource identifiers may be included in the webpage definition 116 retrieved by the web browser 112 and/or generated dynamically in response to execution of executable code (e.g., JavaScript) included or referenced by the webpage definition 116.

System 100 of FIG. 1 additionally comprises a server system 150 which acts as a proxy between the client device 110 and the content provider 130 and facilitates the delivery of web content from the content provider 130 to the client device 110 over the network 140. That is, the server system 150 is configured to act as an intermediary for requests for webpages originating from the web browser 112 configured on the client device 110. In this respect, the server system 150 may operate transparently (e.g., without requiring any manual configuration by an end user and/or a content origin). In some examples, the server system 150 may comprise a proxy server, a gateway server, an edge server, or any other apparatus suitable for implementing the following techniques.

According to some embodiments, the component 120 (e.g., component 120 is a Nanovisor) may be configured to control manipulation of the data structure 118 representing the structure of the webpage defined by webpage definition 116. For example, the component 120 may be configured to control access to a DOM (Document Object Model) tree by intercepting requests to the DOM interface. In effect, the component 120 serves as a virtualization layer to control access to the DOM interface. This virtualization may be facilitated by one or more wrapper methods/functions with respect to one or more of the APIs of the DOM (e.g., Document API interface of a webpage) that replace and wrap corresponding standard API methods/functions of the DOM (e.g., method API calls to create, delete or update elements in the DOM via a Document API interface are replaced with corresponding wrapper methods). For example, particular memory address locations identifying standard code of the DOM API (e.g., Document API) methods/calls are replaced with memory address locations of replacement wrapper methods/functions provided via component 120. In some embodiments, DOM core level 1 APIs for manipulating the DOM tree are supplanted by the equivalent interfaces provided via component 120. In this manner, the component 120 is able to intercept requests for resources and modify the requests (e.g., transform/encode the resource location identifier, or URL, of a request) in a manner that is transparent to other processes running within the web browser 112 environment. In other words, the component 120 ensures that any other processes running within the web browser only have access to the encoded resource identifiers and thus are unable to determine the original identity (e.g., original location identifier) of resources associated with the webpage. This virtualization of the DOM interface can be used by the component 120 to implement some of the steps of the image transport techniques that are performed on the client device.

According to some embodiments, one optimization enabled by virtualization of the DOM involves the encoding of resource identifiers, whereby to cause the web browser 112 to request a resource from a content server other than that from which the resource would be requested without the encoding. For example, rather than request resources from an origin server, resources are requested from a proxy server (e.g., server system 150). In some embodiments, the component 120 may utilize one or more API method/function wrappers to intercept a request to add or modify an object stored in the DOM tree and modify any resource identifiers included in the request.

In some examples, the request to add or modify an object in the DOM tree may originate from one or more executable code in or referenced by the webpage definition 116, which are executed by the web browser 112 and intercepted to invoke the component 120. In this manner, the component 120 is able to transform dynamically generated and utilized resource identifiers before they are added to the DOM tree. In some examples, the one or more executable code which invoke and implement the component 120 may be inserted into the webpage definition 116 by the server system 150 prior to delivering the webpage definition 116 to the client device 110.

In some embodiments, the component 120 is configured to control access to the DOM interface to "intercept" resource requests originating from the one or more code instructions such that network requests for resources are not blocked by the content modification component 114. To achieve this, the component 120 may implement one or more wrapper methods/functions with respect to one or more APIs that cause the web browser 112 to issue network requests. For example, the component 120 may implement one or more wrapper methods for the .setAttribute API method to intercept setting of an attribute of a DOM element. In some examples the requests to the API call may originate from a script included in the webpage definition 116 and/or a script resource referenced by the webpage definition 116, which, when executed, includes one or more dynamic resource identifiers.

In some embodiments, when web browser 112 requests a webpage, the web browser is provided a modified webpage file of the original webpage. For example, rather than providing the originally requested HTML file of the original requested webpage, the web browser is provided an alternative webpage file of the original webpage that includes component 120. In some embodiments, rather than providing the full HTML webpage file of an original requested webpage, the web browser 112 is provided an alternative webpage file of the original webpage that includes component 120, but not the complete contents of the requested webpage (e.g., HTML file) that would have been provided in a traditional response. When web browser 112 attempts to render the alternative webpage file, component 120 is executed; component 120 may then request and receive contents of the original requested webpage. Because this allows component 120 to access the contents of the original requested webpage prior to including it in the DOM for rendering by a web browser, component 120 is able to modify the contents of the original requested webpage, including the resource identifier, prior to rendering and detection by content modification component 114.

In some embodiments, rather than requesting a resource of a webpage to be rendered directly from its original content source identified by an original webpage, the request is proxied and/or rerouted via an intermediary such as server system 150.

In some embodiments, component 120 may be injected into a webpage based on standards-based (e.g., HTML, JavaScript, ActionScript, etc.) procedures. For example, after server system 150 receives a request from web browser 112 requesting an HTML webpage file, server system 150 injects code implementing component 120 into an alternative HTML webpage file of the requested HTML file, and then sends the response back to web browser 112. In some embodiments, component 120 may be injected into a webpage by a content provider directly. For example, web browser 112 requests an HTML webpage file directly from content provider 130 and content provider 130 provides an alternative webpage file with the code of injected component 120. Content provider 130 may be a content producer of the provided content. In some embodiments, component 120 may be injected by adding JavaScript client code in the head section of an alternative HTML webpage file.

Configuring proxy acceleration network 100 is highly complex and involves a large amount of configuration data. Proxy acceleration system 100 includes different components, such as proxy servers and client side virtualization agents (also referred to as Nanovisors) running on the client devices. Each of the components may be configured differently from the others. In addition, proxy acceleration network 100 supports many different services (e.g., HTML streaming), and the modules (e.g., HTML streaming module) corresponding to the supported services may have many different configurable options.

In some other techniques, when a service or web browser requests for a configuration for a particular setup, the service or web browser sends a configuration query through the network to a configuration service; in response, the configuration service queries a centralized configuration database and then sends a full configuration query result in the form of a set of configuration data through the network back to the service or web browser. This approach has significant scalability and performance issues. For example, many instances of a particular service may be deployed in many different geographical locations, and each instance of the service may issue numerous configuration requests to the configuration service within a short period of time. As the number of services, the number of instances of each service, and the number of configuration requests for each instance of service increase, the network becomes increasingly congested by the large number of configuration queries and query results, and the configuration service becomes inundated with configuration requests that the configuration service is no longer capable of handling the configuration requests properly, efficiently or on time.

In some other techniques, instead of having a service or web browser requesting for a configuration from the configuration service each time, the configuration service (e.g., via the use of light SQL or embedded SQL) sends the entire set of configuration data and an executable configuration query engine to the service or web browser. When the service or web browser needs a configuration, the service or web browser runs the query engine on top of the entire set of configuration data locally to obtain the specific configuration data that it needs. Since the entire set of configuration data includes information that applies to all situations and different services, and the query engine includes executable code that handles all possible situations and different services, significant portions of the entire set of configuration data and the executable configuration query engine code are never used by the service or web browser, which is highly inefficient. The disadvantage is that the entire set of configuration data and the executable configuration query engine together occupy a significant amount of storage space, which is particularly inefficient and undesirable when the configuration is used for configuring an application running on a client user device where storage space is limited. In addition, this approach requires the configuration service to send updates of the same set of configuration data and executable configuration query engine to every service even when the updated information is triggered by changes to a single service. Therefore, improved techniques for configuring services or applications running on client devices are desirable.

In the present application, improved techniques for configuring services or web browsers are disclosed. The techniques are hereinafter referred to as the configuration transformation and delivery service or the Cenome configuration service.

A method of generating an optimized executable configuration query engine is disclosed. A set of one or more immutable configuration parameters associated with a configurable service or application is received. At least a portion of a set of configuration data in a configuration database and at least a portion of the set of one or more immutable configuration parameters are transformed into a set of data and code in a compiler-readable format. An optimized subset of the set of configuration data in the configuration database is selected based at least in part on the set of one or more immutable configuration parameters. An optimized executable configuration query engine is generated based at least in part on the set of one or more immutable configuration parameters, wherein the optimized executable configuration query engine serves configuration data from the selected optimized subset of the set of configuration data.

Figure 2:
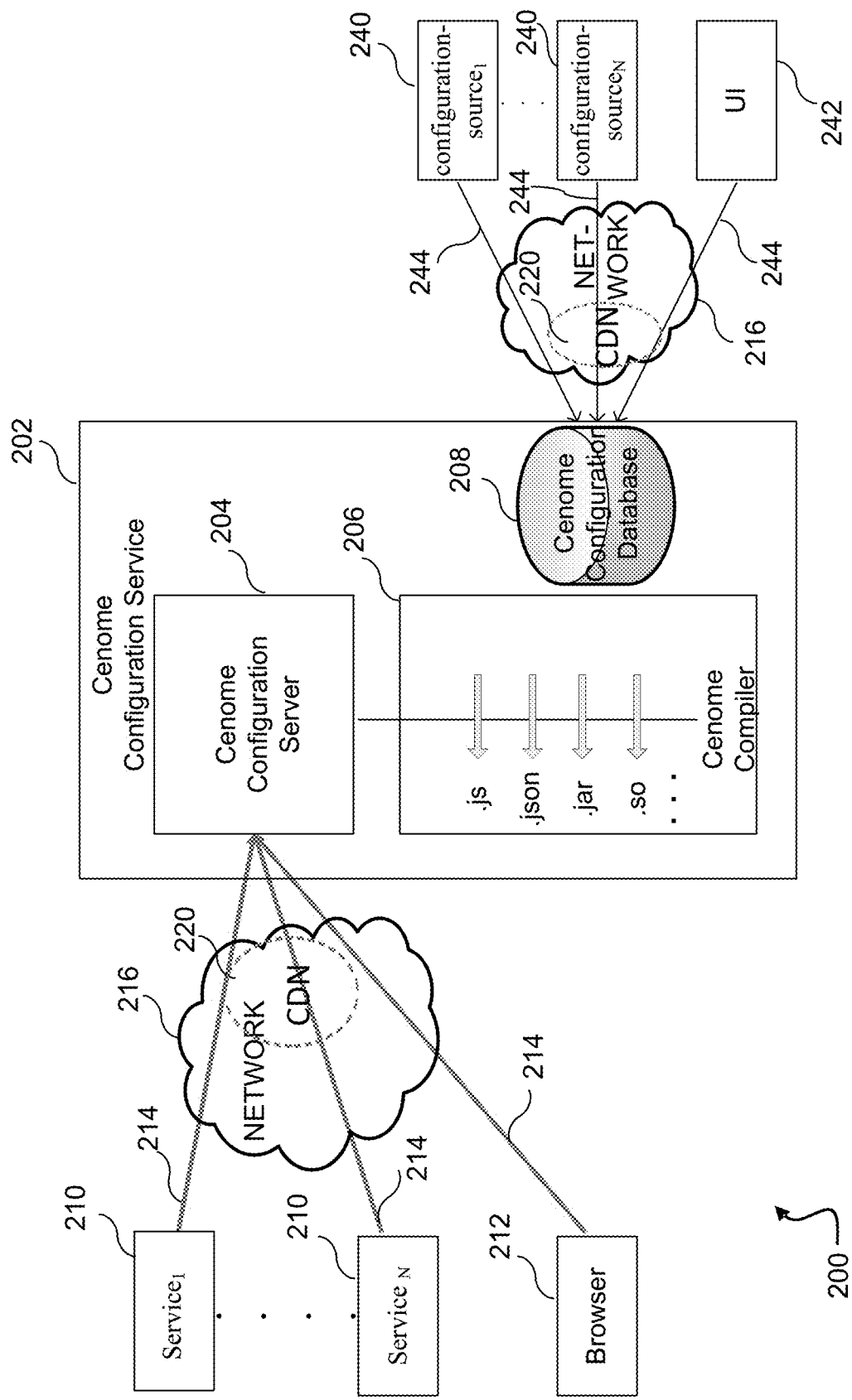
FIG. 2 is a schematic diagram showing an example of a system 200 using a configuration transformation and delivery service 202 (also referred to as Cenome configuration service 202) for configuring services and web browsers.

FIG. 2 is a schematic diagram showing an example of a system 200 using a configuration transformation and delivery service 202 (also hereinafter referred to as the Cenome configuration service 202) for configuring services and web browsers. Cenome configuration service 202 includes a Cenome configuration server 204, a Cenome compiler 206, and a Cenome configuration database 208. System 200 includes a plurality of services (service$_1$ 210, service$_2$ 210, ... and service$_N$ 210) that obtain configuration services from Cenome configuration service 202. In some embodiments, these services may be any services that improve the performance, consumer experience, and security of different web and mobile applications. For example, these services may include HTML streaming service, Ad-recovery service, Nanovisor service, Botox service, client-profiler service, Cerberus service, or other services provided by Instart Logic, Inc. System 200 may also include a plurality of web browsers 212, each obtaining configuration services from Cenome configuration service 202. For example, when an end-user's web browser 212 navigates to a webpage on a particular website, the Nanovisor running in the end-user's web browser 212 may need to obtain a configuration that is customized for that particular website and webpage.

Figure 3:
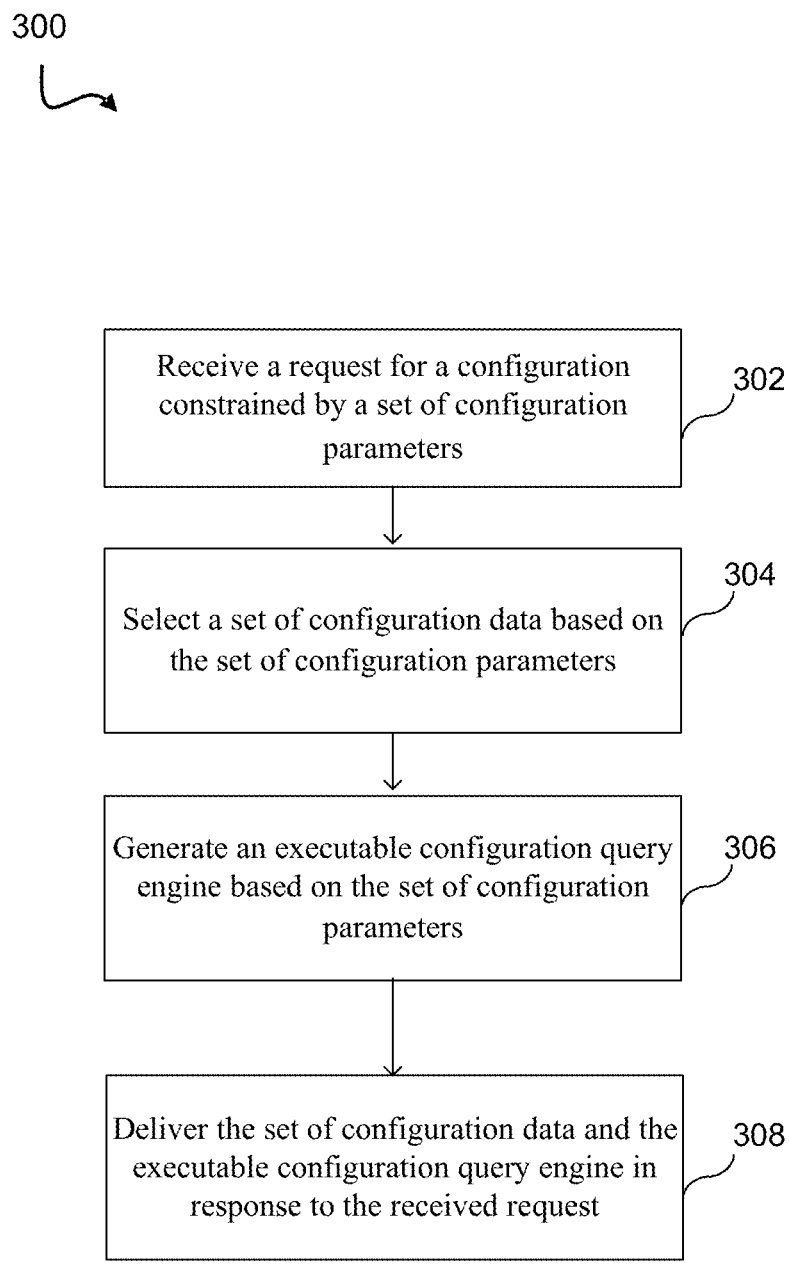
FIG. 3 illustrates an example of a process 300 for providing configurations to a plurality of services and web browsers.

FIG. 3 illustrates an example of a process 300 for providing configurations to a plurality of services and web browsers. In some embodiments, process 300 may be performed by the Cenome configuration service 202 as shown in FIG. 2.

When a service 210 or web browser 212 requests for a configuration for a particular setup, the service 210 or web browser 212 sends an initial and partial configuration query 214 through a network 216 (that may include a CDN 220) to the Cenome configuration service 202. The initial and partial configuration query 214 is then received by the Cenome configuration service 202 at step 302 of process 300. The initial partial configuration query 214 includes a set of one or more immutable configuration parameters or constraints. As an illustrative non-limiting example, the set of immutable configuration parameters or constraints may include Xyz.com as the domain, "Nanovisor" as the unit/service that needs configuration, Google Chrome as the web browser, and Windows 10 as the operating system.

In response to the partial configuration query 214, the Cenome configuration server 204 of Cenome configuration service 202 serves a partial configuration query result back to service 210 or web browser 212. The partial configuration query result includes a subset of the configuration data in the Cenome configuration database 208 in the form of a set of data, plus a query engine in the form of an executable program for running subsequent configuration queries. The configuration query result is a partial configuration query result because it is an initial first-part configuration query result obtained from a two-part querying process. A final full configuration query result may be further obtained from the second part of the two-part querying process. The first part of the two-part querying process may be performed on the Cenome configuration service 202 side, and the second part of the two-part querying process may be performed on the service 210 side or the web browser 212 side that requires the configuration.

The first part of the two-part querying process may be performed on the Cenome configuration service 202 side. At step 304 of process 300, Cenome configuration service 202 uses the immutable configuration parameters sent in the initial partial configuration query 214 to optimally select a subset or slice of the entire configuration data in the configuration database 208. Continuing with the illustrative example given above, the subset or slice of configuration data is optimally selected based on the immutable configuration parameters, including Xyz.com as the domain, "Nanovisor" as the unit that needs configuration, Google Chrome as the type of web browser, and Windows 10 as the operating system. By narrowing down the configuration data needed, the size of the configuration data sent to service 210 and the network bandwidth required to deliver the configuration data are significantly reduced. In addition, at step 306 of process 300, Cenome configuration service 202 uses the immutable configuration parameters sent in the initial partial configuration query 214 to optimally generate an executable configuration query engine that can be run by the requesting service 210 or web browser 212 to make subsequent queries on top of the subset of configuration data when subsequent configurations with additional configuration parameters or constraints are needed. At step 308 of process 300, the Cenome configuration service 202 sends the partial configuration query result (i.e., the subset of configuration data determined at step 304 and the executable configuration query engine determined at step 306) back to service 210 or web browser 212.

The second part of the two-part querying process may be performed on the service 210 side or the web browser 212 side that requires the configuration. In the second part of the two-part querying process, the service 210 side or the web browser 212 that requires the configuration uses the executable configuration query engine to make subsequent queries on top of the subset of configuration data when subsequent configurations are needed. Continuing with the illustrative example given above, suppose that the end-user navigates to a first webpage specified by "path1" in Xyz.com. The Nanovisor may use the executable configuration query engine to make a subsequent query on top of the subset of configuration data with an additional configuration parameter of "path1." The executable configuration query engine then returns a full and final configuration query result for configuring the Nanovisor to run on the first webpage. Similarly, when the end-user navigates to a second webpage specified by "path2" in Xyz.com, the Nanovisor may use the executable configuration query engine to make another subsequent query on top of the subset of configuration data with an additional configuration parameter of "path2". The executable configuration query engine then returns a full and final configuration query result for configuring the Nanovisor to run on the second webpage.

In the first part of the two-part querying process, Cenome configuration service 202 uses the immutable configuration parameters to optimally select a subset or slice of the entire configuration data in the Cenome configuration database 208. As an illustrative example, the subset of the entire configuration data in the Cenome configuration database 208 may include x number of rows of data in a first table of the configuration database 208, y number of columns of data in a second table of the configuration database 208, z number of rows of data in a third table of the configuration database 208, and so on. In addition, Cenome configuration service 202 uses the immutable configuration parameters to optimally generate a customized executable configuration query engine that can be used by the requesting service 210 or web browser 212 to make subsequent queries on top of the subset of configuration data when subsequent configurations with additional configuration parameters or constraints are needed. In some embodiments, the optimized slice of configuration data and the optimized generated executable configuration query engine are generated by Cenome compiler 206 by utilizing a combination of both static compilation and dynamic compilation techniques. Dynamic compilation is a process used by some programming language implementations to gain performance during program execution. Just-in-time (JIT) is a form of dynamic compilation. The compiler optimizations may be performed at the time of delivery of the partial configuration query result. For example, the optimizations may be performed at a time that is substantially right before the delivery of the initial configuration query result. For example, the optimizations may be performed at a time that is substantially right after the receipt of the initial configuration query. In some embodiments, the entire set of configuration data and the configuration query may be transformed by the Cenome compiler 206 into a compiler-readable format that can be handled by the Cenome compiler 206. For example, Cenome configuration database 208 and the initial partial configuration query 214 may be transformed into a set of instructions, types, and constants, such that the transformed instructions, data types, and constants may be optimized by Cenome compiler 206 to produce an optimized subset of configuration data and an optimized generated executable configuration query engine that are sent together as a partial configuration query result to the requesting service 210.

As disclosed above, the partial configuration query result generated by Cenome compiler 206 includes both a set of configuration data and an executable program. The format of the set of configuration data and the executable program may be any format (e.g., .js, .json, .jar, and .so) that the service 210 or browser 212 may use or consume. For example, a service 210 that runs JavaScript may receive a data file with a .json extension and containing data in the JSON (JavaScript Object Notation) format, and an executable file with a .js extension in the JavaScript format. However, it should be recognized that Cenome configuration service 202 may deliver an optimized partial configuration query result that falls within a spectrum, depending on the particular setup or situation. On one end of the spectrum, the optimized partial configuration query result may include only a set of configuration data (i.e., a full configuration query result) without any executable configuration query engine. On the opposite end of the spectrum, the optimized partial configuration query result may include the entire set of configuration data and an executable configuration query engine.

Cenome configuration service 202 has many benefits over other configuration techniques described above. Because Cenome configuration service 202 does not require a service 210 to send a configuration query across the network 216 to a centralized database each time when a configuration is needed, it does not have the scalability and performance issues described above. Because Cenome configuration service 202 does not need to send to the service 210 or web browser 212 the entire set of configuration data and a query engine executable file (that is large-sized and one-size-fits-all), storage space for the configuration data and the executable file is significantly reduced, which is ideal for configuring an application running on a client user device. In addition, this approach does not need to send updates of the same set of configuration data and executable configuration query engine to every service when the updated information is triggered by changes to a single service.

In the present application, configuration refers to any generic mechanisms for controlling and changing the behavior of an existing system. For example, the configuration may define the behavior of a system for responding to incoming requests. For example, the configuration may be used to control how web applications or contents are downloaded from an online store or digital distribution platform in response to any incoming requests.

With continued reference to FIG. 2, the configuration data stored in Cenome configuration database 208 may be created, updated, or deleted by the customers of the services 210 at any time. For example, one of the customers is the administrator of Xyz.com. The administrator of Xyz.com may create, update, or delete the configuration data associated with Xyz.com for one or more of the services 210 in a number of ways. In some embodiments, the administrator may create, update, or delete the configuration data stored in Cenome configuration database 208 by employing a user interface (UI) 242, as shown in FIG. 2. Instructions 244 to create, update, or delete configuration data may be sent to Cenome configuration database 208 by UI 242. UI 242 may include a command line interface, a graphical user interface (GUI), and the like. In some embodiments, a customer may create, update, or delete the configuration data stored in configuration database 208 using other configuration sources 240 (e.g., configuration-source$_1$, configuration-source$_2$, . . . configuration-source$_N$). For example, a configuration-source 240 may be a script with APIs (application programming interfaces) that is stored in a file repository. The customer may create, update, or delete the configuration data in configuration database 208 by sending the script as instructions 244 to Cenome configuration service 202, where the script is executed to create, update, or delete the data in Cenome configuration database 208.

Figure 4:
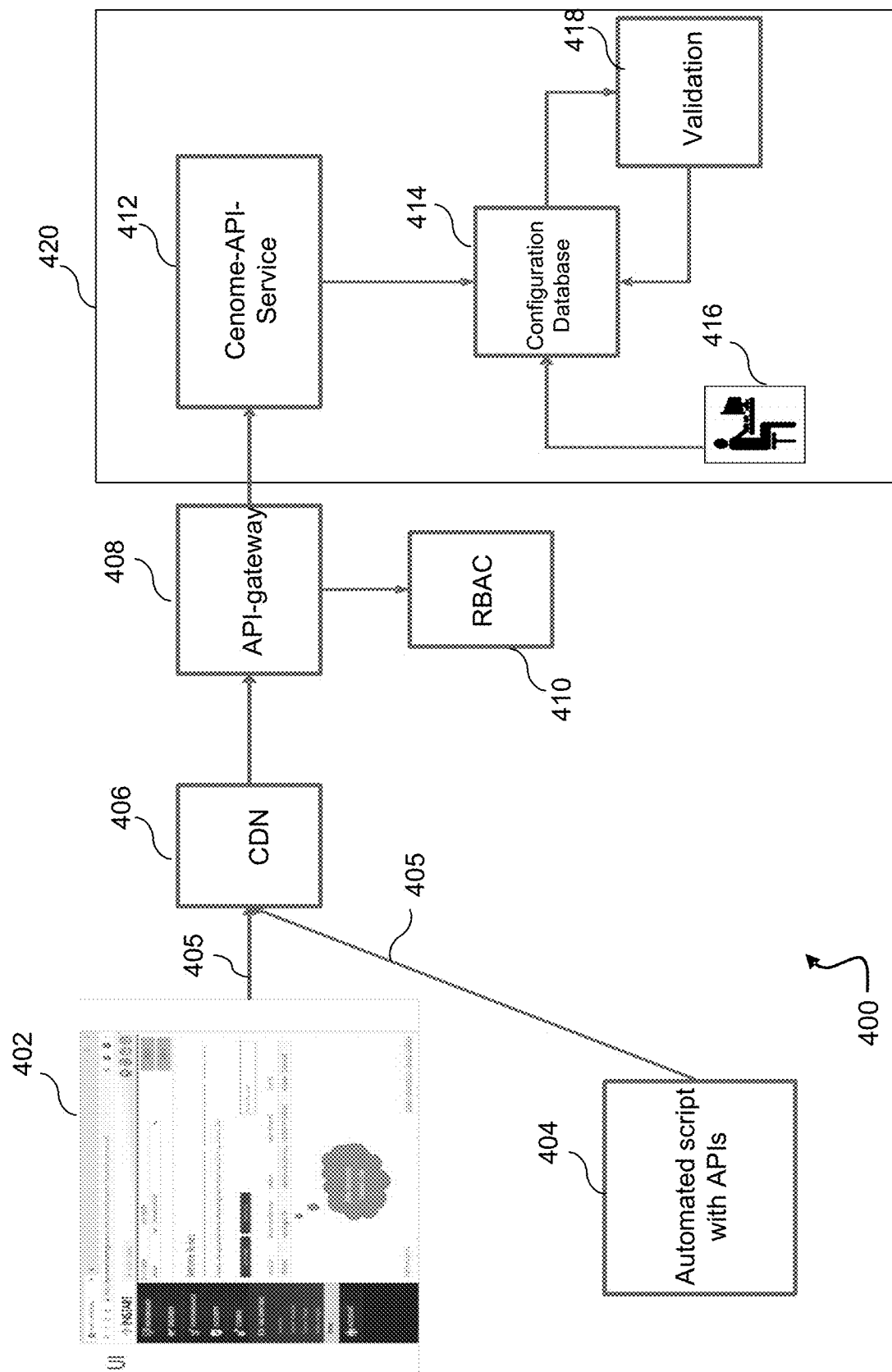
FIG. 4 is a schematic diagram showing an example of a system 400 for creating, updating, and deleting the configuration data stored in the Cenome configuration database 314 of Cenome configuration service 420.

FIG. 4 is a schematic diagram showing an example of a system 400 for creating, updating, and deleting the configuration data stored in the Cenome configuration database 314 of Cenome configuration service 420. An administrator of a customer may create, update, or delete the configuration data stored in Cenome configuration database 314 by using a user interface (UI) 402. Instructions 405 to create, update, or delete configuration data may be sent to Cenome configuration database 314 by UI 402 through a CDN 306. UI 402 may include a command line interface, a graphical user interface (GUI), and the like. An administrator of a customer may also create, update, or delete the configuration data stored in Cenome configuration database 314 by sending automated scripts with APIs 404 as the instructions 405 through the CDN 406. The instructions 405 may further be authorized or authenticated by an API-gateway 408 and a RBAC 410 (role-based access control) module before the instructions are sent to a Cenome-API-service 412 that modifies the configuration database 414. In some embodiments, a validation module 418 further validates that the instructions 405 are correct and legitimate.

Figure 5:
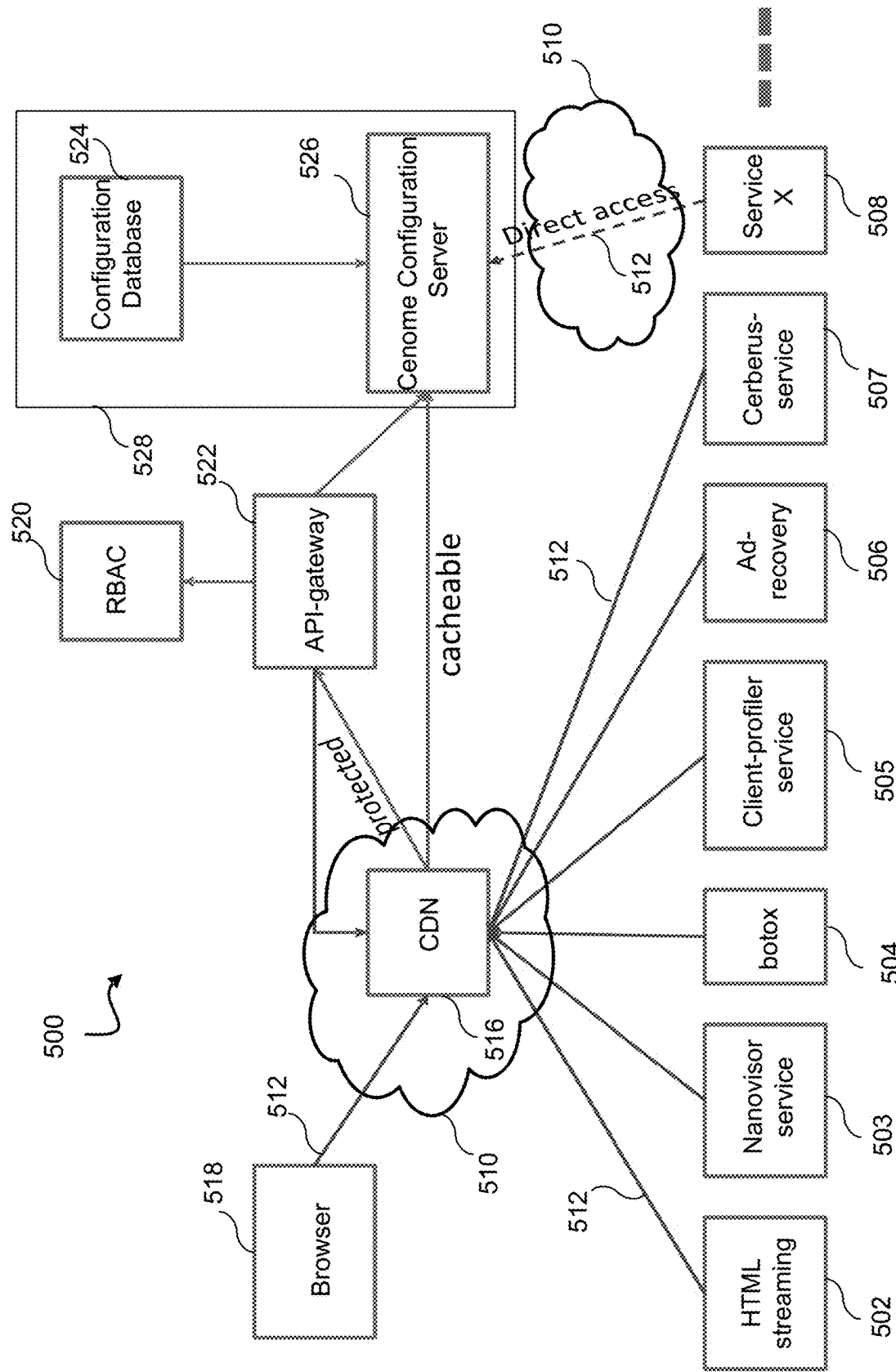
FIG. 5 is a schematic diagram showing an example of a system 500 for configuring a plurality of services and web browsers using a Cenome configuration service 528.

FIG. 5 is a schematic diagram showing an example of a system 500 for configuring a plurality of services and web browsers using a Cenome configuration service 528. Cenome configuration service 528 includes a Cenome configuration server 526, a Cenome configuration database 524, and other modules (not shown in the figure). System 500 includes a plurality of services (services 502-508) that obtain configuration services from the Cenome configuration service 528. In some embodiments, these services may be any services that improve different web and mobile applications' performances, consumer experience, and security. For example, these services may include HTML streaming service 502, Nanovisor service 503, Botox service 504, client-profiler service 505, Ad-recovery service 506, Cerberus service 507, or other services (e.g., service X 508) provided by Instart Logic, Inc. System 500 may also include a plurality of web browsers 518 (only one is shown in the figure), each obtaining configuration services from the Cenome configuration service 528. For example, when an end-user's web browser 518 navigates to Xyz.com, the Nanovisor running in the end-user's web browser 518 may need to obtain a configuration that is customized for Xyz.com.

When one of the services or web browsers makes a request for a configuration for a particular setup, the service or web browser sends an initial and partial configuration query 512 through a network 510 to the Cenome configuration service 528. In some embodiments, the service 508 has direct access to the Cenome configuration service 528, and the initial and partial configuration query 512 is sent directly to the Cenome configuration service 528 through the network 510. In some embodiments, services that generate a high volume of initial and partial configuration queries 512 may send the queries 512 through a CDN 516, such that caching may be performed. In some embodiments, services that require a higher level of security may send the initial and partial configuration queries 512 to an API-gateway 522 and a RBAC (role-based access control) module 520 where the initial and partial configuration queries 512 are authorized or authenticated before the queries 512 are sent to the Cenome configuration service 528. The initial partial configuration query 512 includes a set of one or more immutable configuration parameters or constraints. In response to the partial configuration query 512, the Cenome configuration server 526 of the Cenome configuration service 528 serves a partial configuration query result back to the service or web browser. The partial configuration query result includes a subset of the configuration data in the Cenome configuration database 524 in the form of a set of data, plus a query engine in the form of an executable program for running subsequent configuration queries.

Continuing with the example above in which the end-user's web browser 518 navigates to Xyz.com, the set of immutable configuration parameters or constraints included in the initial partial configuration query 512 may include Xyz.com as the domain, "Nanovisor" as the unit/service that needs configuration, Google Chrome as the web browser, and Windows 10 as the operating system. In response, the partial configuration query result may include a subset of the configuration data in the Cenome configuration database 524 that satisfies the set of immutable configuration constraints plus a query engine for running subsequent configuration queries.

In a second example, one of the services (e.g., service x 508) may be launched for the first time by a management script. The management script sends an initial and partial configuration query 512, requesting the Cenome configuration service 528 to provide a configuration for launching the service. In one example, the set of immutable configuration parameters or constraints included in the initial partial configuration query 512 may include "service x" as the service that needs configuration, "version 10" as the version of the service, Europe as the location where the service is launched, and an indication that the configuration is a one-time configuration. In response, the partial configuration query result may include a set of configuration data that configures the service to use x number of CPUs (central processing units), y gigabytes of memory, and a collection of environment variables. In some embodiments, a query engine is not sent as part of the partial configuration query result in this case because the configuration is a one-time configuration for launching a service. In some embodiments, a query engine is sent as part of the partial configuration query result for running subsequent configuration queries, hi some embodiments, subsequent updated configuration query results may be pushed by the Cenome configuration service 528 to service x 508 at different times. The sending of the subsequent updated configuration query results may be triggered by customers' changes to the configuration data stored in configuration database 524 that affect the configuration of service x 508.

In a third example, one of the services (e.g., service x 508) may be launched for the first time by a management script. The management script sends an initial and partial configuration query 512, requesting the Cenome configuration service 528 to provide a configuration for launching the service. In one example, the set of immutable configuration parameters or constraints included in the initial partial configuration query 512 may include "service x" as the service that needs configuration, "version 10" as the version of the service, Europe as the location where the service is launched, and an indication that the configuration is a one-time configuration. In response, the partial configuration query result may include a set of configuration data that configures the service to use x number of CPUs (central processing units), y gigabytes of memory, and a collection of environment variables. In some embodiments, a query engine is not sent as part of the partial configuration query result in this case because the configuration is a one-time configuration for launching a service. In some embodiments, a query engine is sent as part of the partial configuration query result for running subsequent configuration queries. In some embodiments, service x 508 may periodically (e.g., every five minutes, every hour, or every twenty-four hours) poll the Cenome configuration service 528 whether a new configuration query result for the service is needed because there have been changes to the configuration data stored in configuration database 524 that affect the configuration of service x 508. If a new configuration query result is determined as needed, the Cenome configuration service 528 may send an updated configuration query result to the service and the service may reload itself using the new configuration data and update the stored query engine with an updated version.

In some embodiments, the configuration of a service 210 or a web browser 212 using the Cenome configuration service 202 may be modeled as a state machine. A state transition from one state to another is triggered by inputs, e.g., when one or more configuration parameters or constraints corresponding to the service or application change over time. For example, suppose that an end-user navigates to a webpage specified by "path2" in Xyz.com from a previous webpage specified by "path1" in Xyz.com. The Nanovisor's configuration state machine may then transition from one state to another.

Each of the states in the configuration state machine may include one or more configuration functions (hereinafter also referred to as one or more configuration funclets). These configuration funclets perform the steps for transitioning the state machine from the current state to other states. In other words, the configuration funclet of a current state may call one or more of the configuration funclets to transition the state machine from the current state to another state. Because the executable configuration query engine is used by the requesting service 210 or web browser 212 to obtain subsequent query results for re-configuring the service or web browser, which is required due to the state changes caused by the configuration parameters or constraints changes, the executable configuration query engine includes a plurality of configuration funclets that implement the states of the configuration state machine. The format of a configuration funclet may be any format (e.g., .js, .json, .jar, and .so) that the service 210 or browser 212 may use or consume. For example, a service 210 that runs JavaScript may receive a plurality of configuration funclets, included in one or more JavaScript files.

Figure 6:
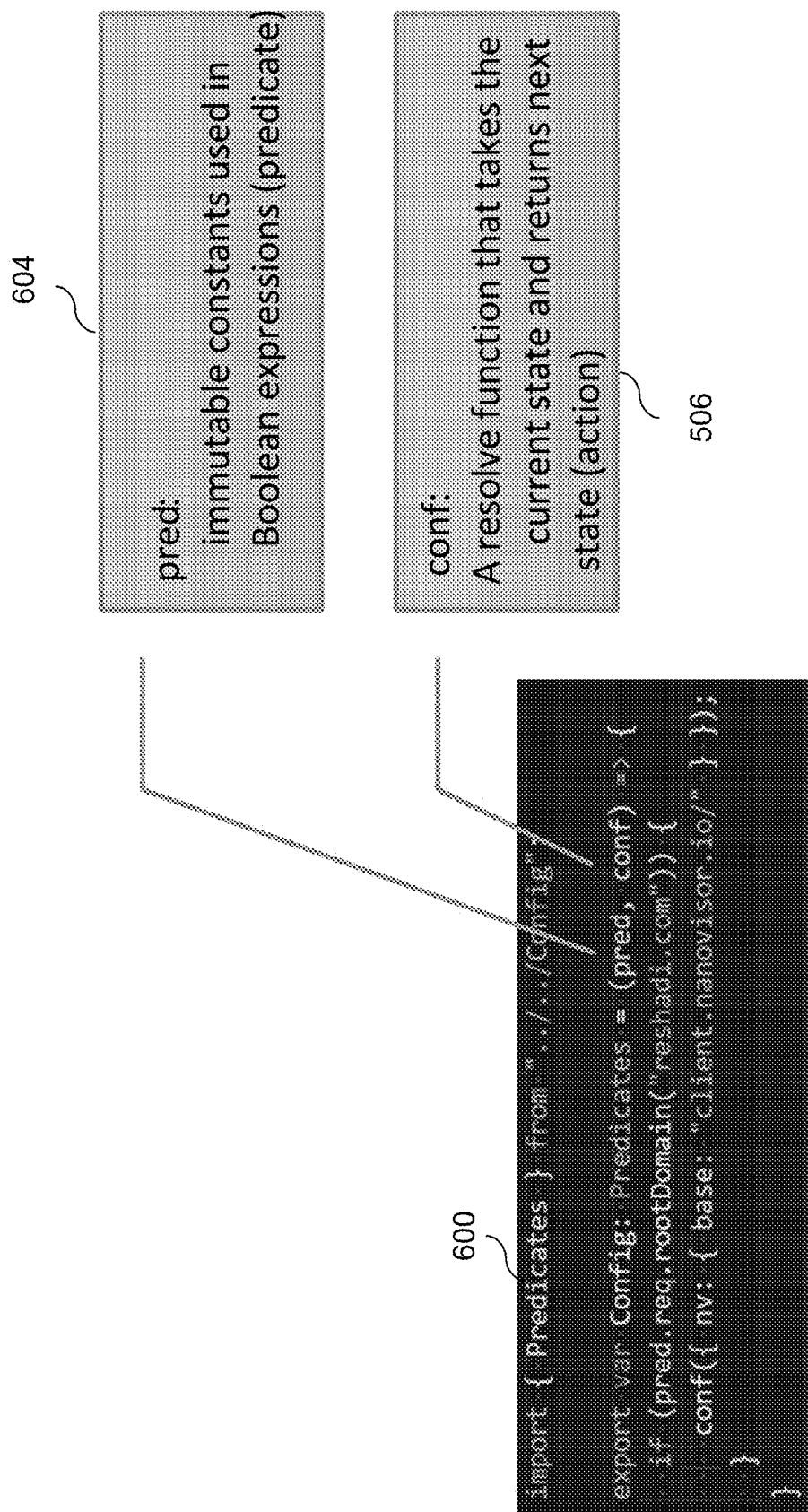
FIG. 6 is an example of a configuration funclet 600 that may be included in an executable configuration query engine.

FIG. 6 is an example of a configuration funclet 600 that may be included in an executable configuration query engine. Unlike a serverless function, a configuration funclet 600 is a small simple function that not only may be sent to the edge (such as an edge server), but may be sent and seamlessly run on different platforms anywhere in a cloud, including a client device. Furthermore, a configuration funclet 600 is optimized and generated dynamically on the fly right before the time of delivery of the configuration funclet based on a plurality of immutable configuration parameters and constraints. Therefore, the configuration funclet 600 is compiled depending on who is requesting for the configuration and customized and optimized for a set of particular requirements. Since a configuration funclet 600 runs on different platforms, including a client device, a configuration funclet 600 is also referred to as a universal configuration funclet 600. A configuration funclet 600 may be invoked by an application or by other funclets.

Each configuration funclet 600 may include an immutable portion and a mutable portion. The immutable portion cannot be modified after it is created; it is unchanging over time or unable to be changed. An immutable object that is passed to the configuration funclet 600 will not be changed. In contrast, the mutable portion may be modified after it is created; the mutable part is changing over time or able to be changed. In some embodiments, the immutable portion of a configuration funclet 600 may include a set of immutable configuration input parameters or constraints. For example, a set of immutable configuration input parameters or constraints may include Xyz.com as the domain, "Nanovisor" as the unit/service that needs configuration, Google Chrome as the web browser, and Windows 10 as the operating system. As will be described in greater details below, the set of immutable configuration parameters or constraints allows the optimization to be performed by the Cenome compiler 206. The mutable portion of a configuration funclet 600 may be a query result, such as an initial and partial configuration query result provided by Cenome configuration service 202, or a subsequent configuration query result that is generated on the service 210 or web browser 212 side.

Referring to FIG. 6, in this particular example the configuration funclet 600 includes a set of immutable constants 604 (see the argument named "pred"). The set of immutable constants 604 may be used in a plurality of Boolean expressions. The configuration funclet 600 further includes a resolve funclet 606 (see the argument named "conf"). When the resolve funclet 606 is called, it takes the current state of the state machine and the set of immutable constants 604 and returns the next state and action of the state machine. The resolve funclet 606 is a portion of the configuration state machine. In some embodiments, the configuration funclet 600 may return a result, such as a subset of the configuration data in the Cenome configuration database 208 in the form of a set of data, plus a query engine in the form of an executable program for running subsequent configuration queries. In some embodiments, the configuration funclet 600 does not return a result, but the states of the state machine may be updated by the resolve funclet 606.

In some embodiments, the generation of a configuration funclet 600 may follow a set of rules. The rules provided herein are merely illustrative examples, and therefore should not be viewed as exhaustive or limiting. The configuration funclet 600 may be stored in a ruleset, which is a folder to store a logical categorization of rules or other rulesets. The ruleset may be determined by a customer. For example, there may be a property or domain ruleset and a device ruleset. The ruleset may be mapped to an index that invokes rules in their corresponding order. In some embodiments, the configuration funclet 600 includes a single set of immutable constants (e.g., "pred" 604) and a single resolve funclet (e.g., "conf" 606). The result of the configuration funclet 600 may be in the form of a set of code or a set of JSON data. A rule may be stored as a separate file for tracking history, e.g., 1.3.2-R123456-metadata.data.rule.ts; a rule may have a priority to determine its order within a ruleset; a rule may have an ID for referencing via an API; a rule may have a set of metadata; a rule may have a user friendly description; a rule may have a list of labels for filtering; a rule may be enabled or disabled.

As disclosed earlier in the present application, the Cenome configuration service 202 uses a set of immutable configuration parameters to optimally select a subset or slice of the entire configuration data in the Cenome configuration database 208. In addition, Cenome configuration service 202 uses the set of immutable configuration parameters to optimally generate a customized executable configuration query engine that can be used by the requesting service 210 or web browser 212 to make subsequent queries on top of the subset of configuration data when subsequent configurations with additional configuration parameters or constraints are needed.

Figure 7:
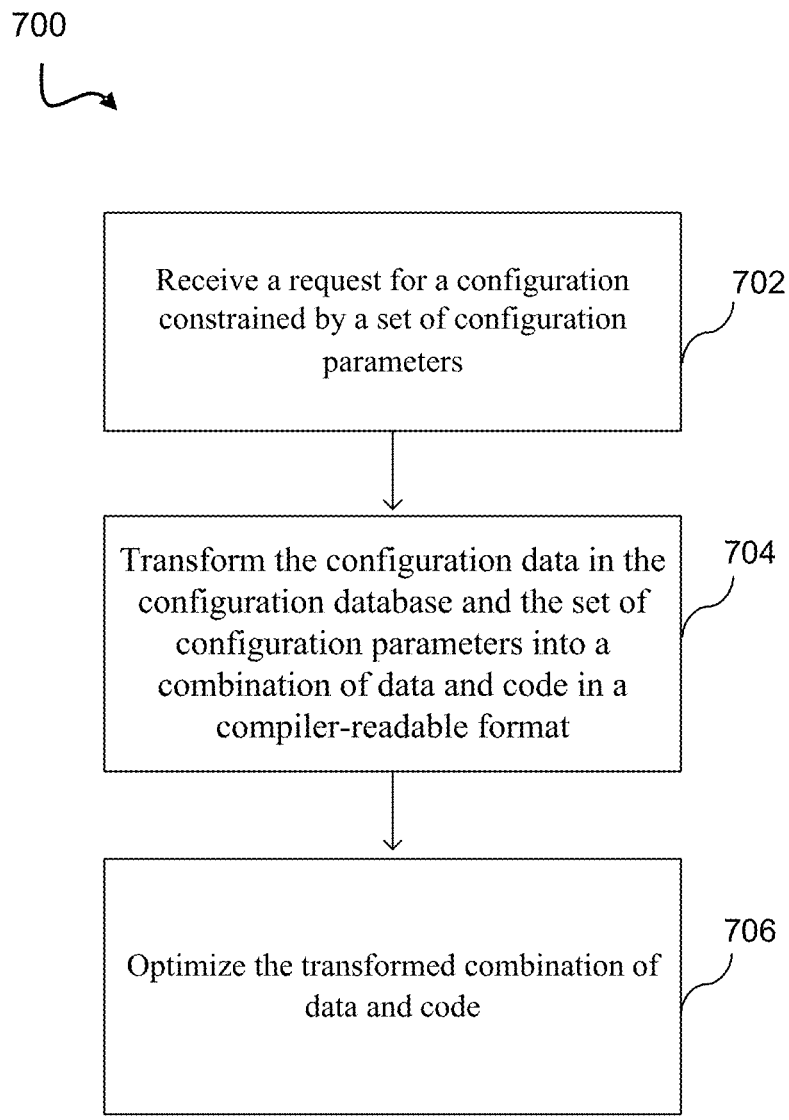
FIG. 7 illustrates an example of a process 700 for selecting an optimized subset of configuration data and generating an optimized executable query engine based on a set of immutable configuration parameters corresponding to the configuration of a service or a web browser.

FIG. 7 illustrates an example of a process 700 for selecting an optimized subset of configuration data and generating an optimized executable query engine based on a set of immutable configuration parameters corresponding to the configuration of a service or a web browser. In some embodiments, process 700 is performed by the Cenome configuration service 202 in FIG. 2. One of the inputs of process 700 is the entire set of configuration data in the Cenome configuration database 208, which includes configuration information that applies to all situations and different services. In other words, the entire set of configuration data includes configuration information that may not satisfy one or more of the set of immutable configuration constraints. Another input of process 700 is a set of immutable configuration parameters or constraints. The output of process 700 is an optimized subset of configuration data and an optimized executable query engine that are both generated based on the set of immutable configuration parameters corresponding to the configuration of a service or a web browser.

At step 702, a request for a configuration constrained by a set of configuration parameters is received by the Cenome configuration service 202. In particular, when a service 210 or web browser 212 requests for a configuration for a particular setup, the service 210 or web browser 212 sends an initial and partial configuration query 214 through a network 216 (which may include a CDN 220) to the Cenome configuration service 202. The initial and partial configuration query 214 is then received by the Cenome configuration service 202. The initial partial configuration query 214 includes a set of one or more immutable configuration parameters or constraints. As an illustrative non-limiting example, the set of immutable configuration parameters or constraints may include Xyz.com as the domain, "Nanovisor" as the unit/service that needs configuration, Google Chrome as the web browser, and Windows 10 as the operating system.

At 704, the entire set of configuration data in the configuration database and the set of immutable configuration parameters are transformed into a combination of data and code in a compiler-readable format.

At 706, the transformed combination of data and code is optimized to generate an optimized subset of configuration data and an optimized executable query engine. Both are generated based on the set of immutable configuration parameters corresponding to the configuration of a service or a web browser.

Figure 8:
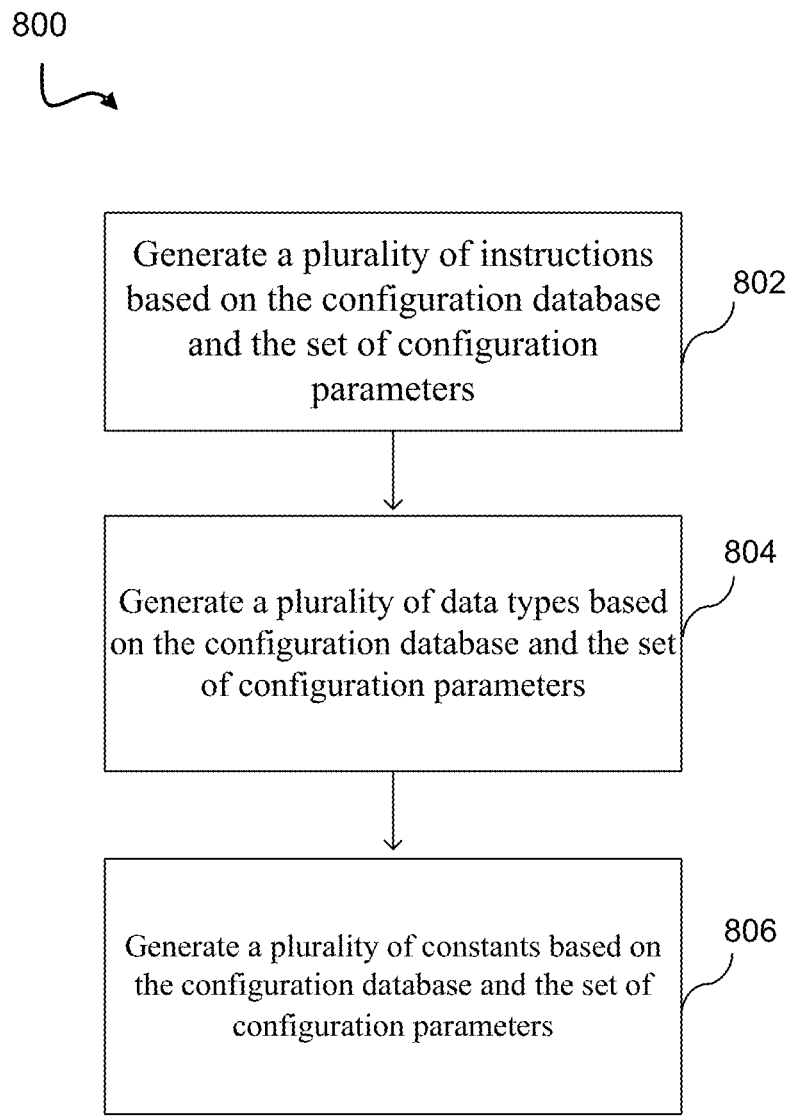
FIG. 8 illustrates an example of a process 800 for transforming the entire set of configuration data in the configuration database and the set of immutable configuration parameters into a combination of data and code in a compiler-readable format.

FIG. 8 illustrates an example of a process 800 for transforming the entire set of configuration data in the configuration database and the set of immutable configuration parameters into a combination of data and code in a compiler-readable format. Prior to the transformation, the entire set of configuration data in the configuration database and the set of immutable configuration parameters are in a format that a database can interpret and operate on. After the transformation, the combination of data and code is in a compiler-readable format that a compiler can handle. In some embodiments, process 800 is performed at step 704 of process 700 by the Cenome configuration service 202 of FIG. 2. In some embodiments, the transformed combination of data and code includes a plurality of funclets. In some embodiments, the transformed combination of data and code includes a plurality of instructions, data types, and constants that a compiler may handle.

At step 802, a plurality of instructions is generated. The instructions or expressions may be any computer instructions in a programming language or format (e.g., JavaScript, Python, Java, C, and C++) that the service 210 or browser 212 may use or consume. For example, if the service 210 that needs the configuration runs JavaScript, then the instructions are in JavaScript format. The instructions may include any conditional statements, conditional expressions, and conditional constructs, such as if-then-else instructions or statements. The instructions may also include loops, such as "for" loops, "while" loops, and "do" loops. The instructions may also include built-in operators, including arithmetic operators (e.g., addition with +, subtraction with -, multiplication with *, and division with mod or /), comparison operators (e.g., >, >=, <, and <=), logical operators (e.g., AND, OR, &&, and ||), assignment operators (e.g., =, and :=), field access operators in a record or object (e.g., .), and scope resolution operators (e.g., ::).

At step 804, a plurality of data types is generated. The types may be any types supported by a programming language or format (e.g., JavaScript, Python, Java, C, and C++) that the service 210 or browser 212 may use or consume. A data type is an attribute of the data that tells the compiler or interpreter how the programmer intends to use the data. A data type constrains the values that an expression, such as a variable or a function, might take. For example, the generated data types may include integers, Booleans, characters, floating-point numbers, alphanumeric strings, classes, and the like.

At step 806, a plurality of constants is generated. The constants may be any constants supported by a programming language or format (e.g., JavaScript, Python, Java, C, and C++) that the service 210 or browser 212 may use or consume. A constant is a value that cannot be altered by the program during normal execution. For example, a constant may be the number 1, a string "hello," and the like.

Figure 9:
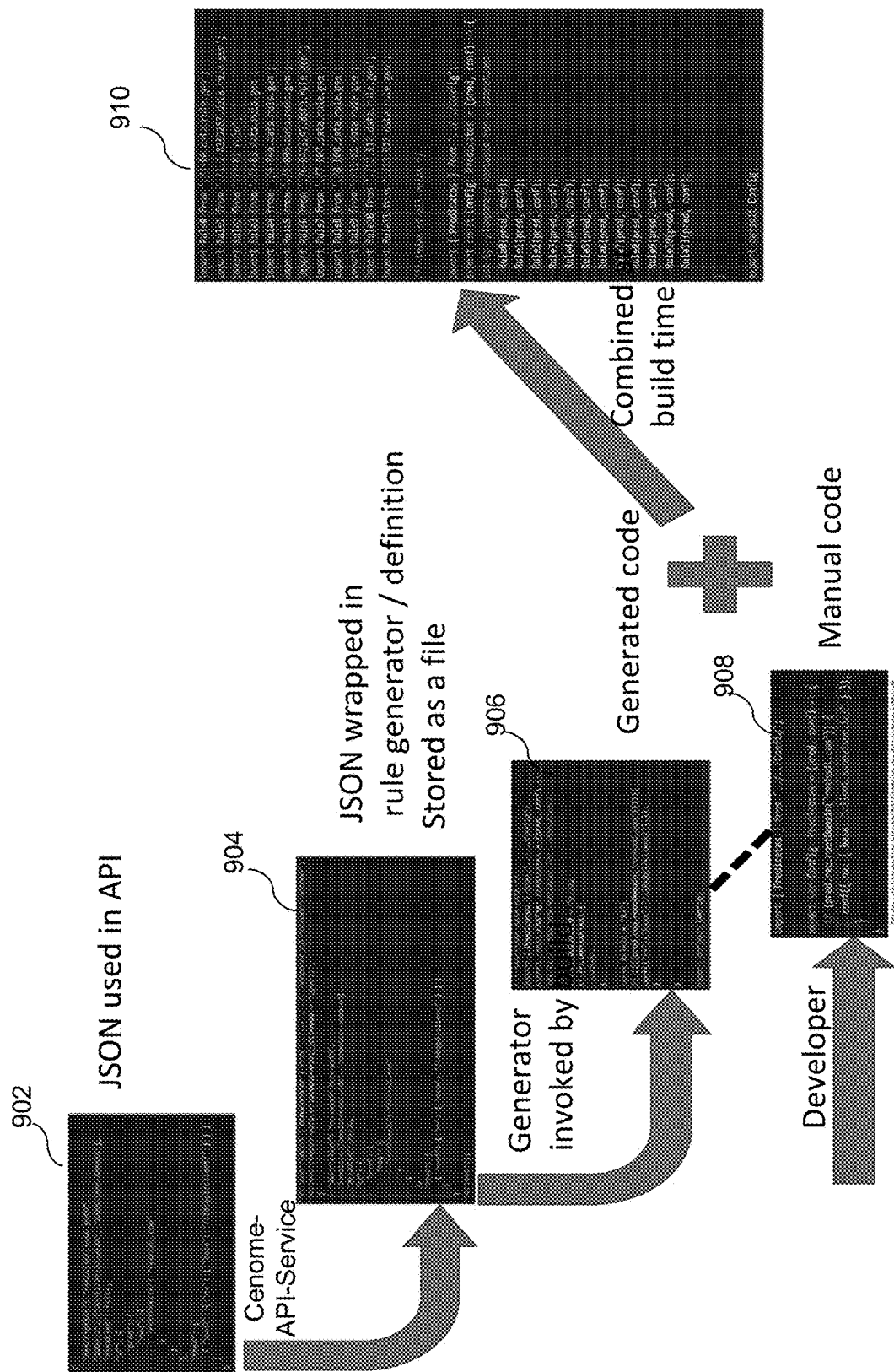
FIG. 9 illustrates an example of the various stages of a transformation performed by process 800.

FIG. 9 illustrates an example of the various stages of a transformation performed by process 800. As shown in FIG. 9, at the first stage, the Cenome-API-service module 412 takes a set of configuration data 902 (e.g., in the JSON format) as input. At the second stage, the Cenome-API-service module 412 converts the set of configuration data 902 into data plus a query. In particular, the Cenome-API-service module 412 adds definitions of a rule generator to the set of JSON configuration data 902 and stores the wrapped data plus query 904 in a file. At the third stage, a build generator is invoked to generate a set of generated configuration data and code 906. The set of generated configuration data and code 906 includes a set of transformed instructions, data types, and constants. At the fourth stage, a human developer may manually add a set of manual code 908. The set of manual code may include instructions, data types, and constants. At the fifth stage, the set of generated configuration data and code 906 is combined with the set of manual code 908 at build time to generate a combination of configuration data and code 910 that is in a compiler-readable format that a compiler can handle. The combination of configuration data and code 910 is a set of pre-optimized code that may be sent to a build system where the pre-optimized code may be optimized using compiler techniques, as will be described in greater details below.

Figure 10:
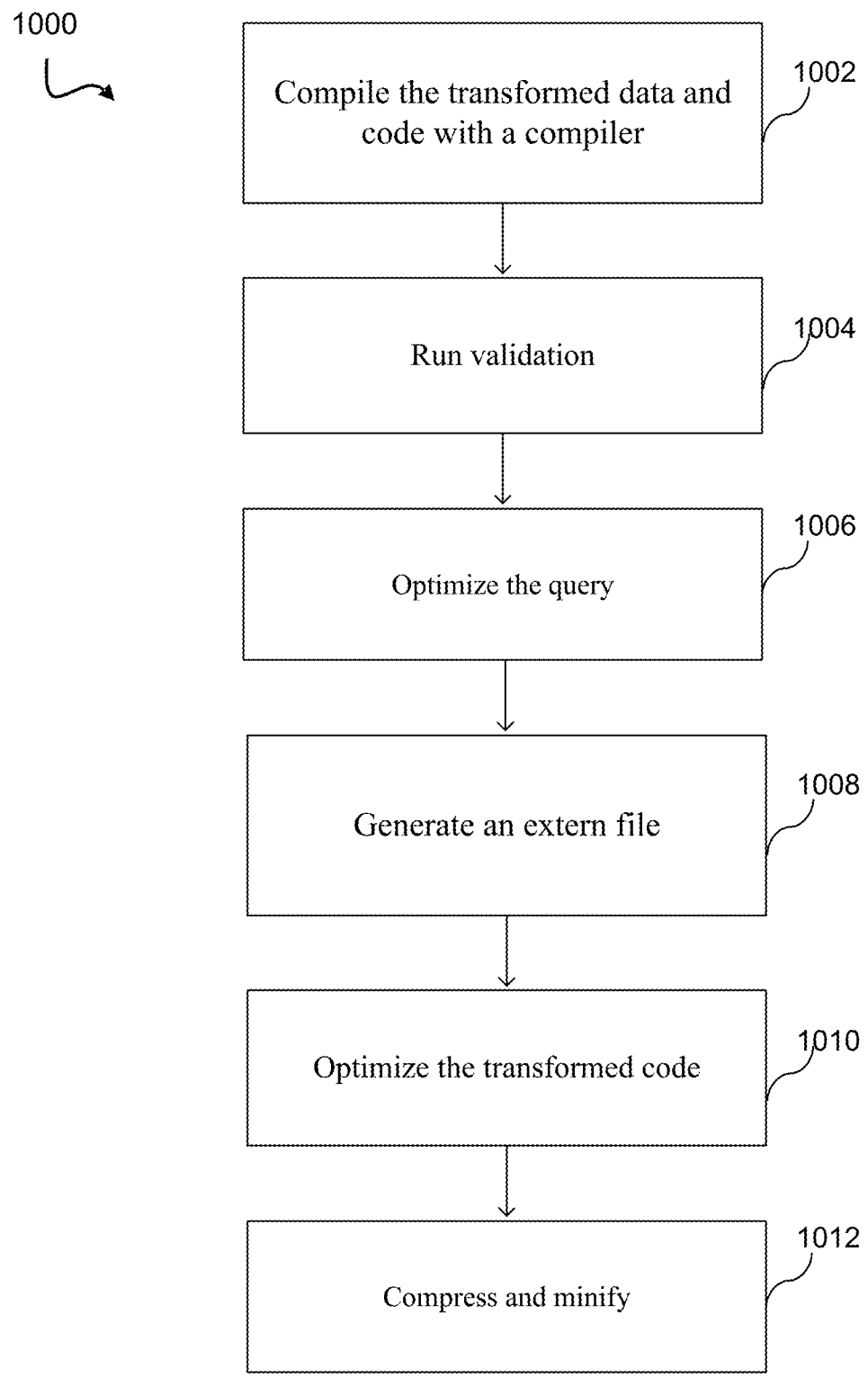
FIG. 10 illustrates an example of a process 1000 for optimizing the transformed combination of data and code to generate an optimized subset of configuration data and an optimized executable query engine.

FIG. 10 illustrates an example of a process 1000 for optimizing the transformed combination of data and code to generate an optimized subset of configuration data and an optimized executable query engine. Both are generated based on the set of immutable configuration parameters corresponding to the configuration of a service or a web browser. In some embodiments, process 1000 is performed at step 706 of process 700 by the Cenome configuration service 202 of FIG. 2. In some embodiments, the optimized subset of configuration data and the optimized executable query engine include a plurality of funclets. A funclet is statically linked to interpret the inputs and dynamically linked and optimized based on the inputs. One of the inputs of process 1000 is the transformed combination of data and code obtained at step 704 of process 700. Another input of process 1000 is the set of immutable configuration parameters or constraints received at step 702 of process 700. The output of process 1000 is an optimized subset of configuration data and an optimized executable query engine that are both generated based on the set of immutable configuration parameters corresponding to the configuration of a service or a web browser.

Broadly, process 1000 uses the immutable configuration parameters to optimally select a subset or slice of the entire configuration data in the Cenome configuration database 208. As an illustrative example, the subset of the entire configuration data in the Cenome configuration database 208 may include x number of rows of data in a first table of the configuration database 208, y number of columns of data in a second table of the configuration database 208, z number of rows of data in a third table of the configuration database 208, and so on. In addition, process 1000 uses the immutable configuration parameters to optimally generate a customized executable configuration query engine that can be used by the requesting service 210 or web browser 212 to make subsequent queries on top of the subset of configuration data when subsequent configurations with additional configuration parameters or constraints are needed. In some embodiments, the optimized slice of configuration data and the optimized generated executable configuration query engine are generated by process 1000 by utilizing a combination of both static compilation and dynamic compilation techniques. Dynamic compilation is a process used by some programming language implementations to gain performance during program execution. Just-in-time (JIT) is a form of dynamic compilation. Different optimization techniques may be employed, including constant propagation, dead code elimination, code size minimization, and the like.

Referring to FIG. 10, at step 1002, the transformed combination of data and code is compiled by a compiler. In some embodiments, symbol, value, and structure checks are performed. In some embodiments, the compilation is performed by a TypeScript compiler. At step 1004, a compiler is used to validate the inputs. In some embodiments, the compiler asserts the correctness or the assumptions of the inputs. At step 1006, query optimization is performed. Different optimization techniques may be employed. For example, using constant propagation, a Boolean expression may be replaced with a true or false value. At step 1008, an extern file is generated using an extern generator. In some embodiments, the extern file includes externs files that are generated for use with Google Closure Compiler or UglifyJS compilers. At step 1010, the transformed code is optimized. In some embodiments, Google Closure Compiler is run to optimize the code. For client code, Google Closure Compiler is run to minimize the code as well. At step 1012, the transformed code is compressed and minified. In some embodiments, UglifyJS is run to obfuscate the configuration and configuration references in the Nanovisor.

It should be recognized that the configuration of certain setup may be scattered in many places. Therefore, a global view of the configuration is needed. In some embodiments, mock inputs are used to check the configuration of a certain setup.

In some embodiments, the optimized subset of configuration data and the optimized executable query engine obtained from process 700 may be cached at different parts of the network. For example, the optimized subset of configuration data and the optimized executable query engine obtained from process 700 may be cached at the browser cache. In some embodiments, the optimized subset of configuration data and the optimized executable query engine obtained from process 700 may be cached at the CDN. In some embodiments, a cache may maintain a plurality of past versions of the optimized subset of configuration data and the optimized executable query engine. These past versions are kept in the cache until the latest and most updated version of the optimized subset of configuration data and the optimized executable query engine have been verified as running correctly.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating an optimized executable configuration query engine, comprising:
   receiving a set of one or more immutable configuration parameters associated with a configurable service or a configurable application;
   transforming by a processor at least a portion of a set of configuration data in a configuration database and at least a portion of the set of one or more immutable configuration parameters into a set of data and code in a compiler-readable format;
   selecting by the processor an optimized subset of the set of configuration data in the configuration database based at least in part on the set of one or more immutable configuration parameters; and
   generating by the processor an optimized executable configuration query engine based at least in part on the set of one or more immutable configuration parameters, wherein the optimized executable configuration query engine serves configuration data from the selected optimized subset of the set of configuration data.

2. The method of claim 1, wherein the at least a portion of the set of configuration data in the configuration database comprises at least some configuration data that do not correspond to the configurable service or the configurable application, and wherein the at least a portion of the set of configuration data in the configuration database comprises at least some configuration data that corresponds to other configurable services or other configurable applications.

3. The method of claim 1, wherein the at least a portion of the set of configuration data in the configuration database comprises at least some configuration data that do not satisfy one or more of the set of one or more immutable configuration constraints.

4. The method of claim 1, wherein the transforming of the at least a portion of the set of configuration data in the configuration database and the at least a portion of the set of one or more immutable configuration parameters into the set of data and code in a compiler-readable format comprises:
   transforming the at least a portion of the set of configuration data in the configuration database and the at least a portion of the set of one or more immutable configuration parameters into a combination of compiler-readable instructions, data types, and constants.

5. The method of claim 4, wherein a compiler-readable instruction is selected from the group consisting of: a conditional statement, a loop, and a built-in operator.

6. The method of claim 4, wherein a compiler-readable data type is selected from the group consisting of: an integer, a Boolean, a character, a string, and a class.

7. The method of claim 1, wherein the transforming of the at least a portion of the set of configuration data in the configuration database and the at least a portion of the set of one or more immutable configuration parameters into the set of data and code in a compiler-readable format comprises:
   adding a set of manual code provided by a human developer to form at least a portion of the set of data and code in the compiler-readable format.

8. The method of claim 1, wherein the selecting of the optimized subset of the set of configuration data in the configuration database based at least in part on the set of one or more immutable configuration parameters further comprises selecting an optimized portion of rows or columns of a table in the configuration database based at least in part on at least one of the one or more immutable configuration constraints.

9. The method of claim 1, wherein the selecting of the optimized subset of the set of configuration data in the configuration database based at least in part on the set of one or more immutable configuration parameters and the generating of the optimized executable configuration query engine based at least in part on the set of one or more immutable configuration parameters are performed at a time that is substantially right after a request for the optimized executable configuration query engine is received.

10. The method of claim 1, wherein the selecting of the optimized subset of the set of configuration data in the configuration database based at least in part on the set of one or more immutable configuration parameters and the generating of the optimized executable configuration query engine based at least in part on the set of one or more immutable configuration parameters use a combination of static and dynamic compilation techniques.

11. The method of claim 10, wherein one of the static and dynamic compilation techniques is selected from the group consisting of: constant propagation, dead code elimination, and code minimization.

12. The method of claim 1, wherein the generated optimized executable configuration query engine comprises a plurality of configuration funclets, wherein a configuration funclet comprises a function that may be sent and run on different platforms in a cloud, the different platforms including a client device.

13. The method of claim 1, wherein the generated optimized executable configuration query engine comprises a plurality of configuration funclets, wherein the plurality of configuration funclets implements a plurality of states of a configuration state machine.

14. The method of claim 1, wherein the generated optimized executable configuration query engine comprises a plurality of configuration funclets, wherein a configuration funclet performs one or more steps for transitioning a configuration state machine from a current state to a next state, wherein the transitioning of the configuration state machine from the current state to the next state is triggered by a change in a configuration parameter change.

15. The method of claim 1, wherein the generated optimized executable configuration query engine comprises a plurality of configuration funclets, wherein a configuration funclet comprises an immutable portion and a mutable portion.

16. A system for generating an optimized executable configuration query engine, comprising:
 a processor; and
 a memory coupled with the processor, wherein the memory is configured to provide the processor with instructions which when executed cause the processor to:
  receive a set of one or more immutable configuration parameters associated with a configurable service or a configurable application;
  transform at least a portion of a set of configuration data in a configuration database and at least a portion of the set of one or more immutable configuration parameters into a set of data and code in a compiler-readable format;
  select an optimized subset of the set of configuration data in the configuration database based at least in part on the set of one or more immutable configuration parameters; and
  generate an optimized executable configuration query engine based at least in part on the set of one or more immutable configuration parameters, wherein the optimized executable configuration query engine serves configuration data from the selected optimized subset of the set of configuration data.

17. The system of claim 16, wherein the at least a portion of the set of configuration data in the configuration database comprises at least some configuration data that do not correspond to the configurable service or the configurable application, and wherein the at least a portion of the set of configuration data in the configuration database comprises at least some configuration data that corresponds to other configurable services or other configurable applications.

18. The system of claim 16, wherein the at least a portion of the set of configuration data in the configuration database comprises at least some configuration data that do not satisfy one or more of the set of one or more immutable configuration constraints.

19. The system of claim 16, wherein the transforming of the at least a portion of the set of configuration data in the configuration database and the at least a portion of the set of one or more immutable configuration parameters into the set of data and code in a compiler-readable format comprises:
 transforming the at least a portion of the set of configuration data in the configuration database and the at least a portion of the set of one or more immutable configuration parameters into a combination of compiler-readable instructions, data types, and constants.

20. The system of claim 19, wherein a compiler-readable instruction is selected from the group consisting of: a conditional statement, a loop, and a built-in operator.

21. The system of claim 19, wherein a compiler-readable data type is selected from the group consisting of: an integer, a Boolean, a character, a string, and a class.

22. The system of claim 16, wherein the transforming of the at least a portion of the set of configuration data in the configuration database and the at least a portion of the set of one or more immutable configuration parameters into the set of data and code in a compiler-readable format comprises:
 adding a set of manual code provided by a human developer to form at least a portion of the set of data and code in the compiler-readable format.

23. The system of claim 16, wherein the selecting of the optimized subset of the set of configuration data in the configuration database based at least in part on the set of one or more immutable configuration parameters further comprises selecting an optimized portion of rows or columns of a table in the configuration database based at least in part on at least one of the one or more immutable configuration constraints.

24. The system of claim 16, wherein the selecting of the optimized subset of the set of configuration data in the configuration database based at least in part on the set of one or more immutable configuration parameters and the generating of the optimized executable configuration query engine based at least in part on the set of one or more immutable configuration parameters are performed at a time that is substantially right after a request for the optimized executable configuration query engine is received.

25. The system of claim 16, wherein the selecting of the optimized subset of the set of configuration data in the configuration database based at least in part on the set of one or more immutable configuration parameters and the generating of the optimized executable configuration query engine based at least in part on the set of one or more immutable configuration parameters use a combination of static and dynamic compilation techniques.

26. The system of claim 25, wherein one of the static and dynamic compilation techniques is selected from the group consisting of: constant propagation, dead code elimination, and code minimization.

27. The system of claim 16, wherein the generated optimized executable configuration query engine comprises a plurality of configuration funclets, wherein a configuration funclet comprises a function that may be sent and run on different platforms in a cloud, the different platforms including a client device.

28. The system of claim 16, wherein the generated optimized executable configuration query engine comprises a plurality of configuration funclets, wherein the plurality of configuration funclets implements a plurality of states of a configuration state machine.

29. The system of claim 16, wherein the generated optimized executable configuration query engine comprises a plurality of configuration funclets, wherein a configuration funclet performs one or more steps for transitioning a configuration state machine from a current state to a next state, wherein the transitioning of the configuration state machine from the current state to the next state is triggered by a change in a configuration parameter change.

30. The system of claim 16, wherein the generated optimized executable configuration query engine comprises a plurality of configuration funclets, wherein a configuration funclet comprises an immutable portion and a mutable portion.

31. A computer program product for generating an optimized executable configuration query engine, the computer program product being embodied in a tangible non-transitory computer readable storage medium and comprising computer instructions for:

receiving a set of one or more immutable configuration parameters associated with a configurable service or a configurable application;

transforming by a processor at least a portion of a set of configuration data in a configuration database and at least a portion of the set of one or more immutable configuration parameters into a set of data and code in a compiler-readable format;

selecting by a processor an optimized subset of the set of configuration data in the configuration database based at least in part on the set of one or more immutable configuration parameters; and generating by a processor an optimized executable configuration query engine based at least in part on the set of one or more immutable configuration parameters, wherein the optimized executable configuration query engine serves configuration data from the selected optimized subset of the set of configuration data.

* * * * *